No. 736,757. PATENTED AUG. 18, 1903.
T. C. MARTIN.
ATTACHMENT FOR TOBACCO PIPES.
APPLICATION FILED DEC. 12, 1902.
NO MODEL.

Witnesses,
E. B. Gilchrist
N. L. Brennan

Inventor,
Thomas Charles Martin,
By his Attorneys,
Thurston & Bates.

No. 736,757.

Patented August 18, 1903.

UNITED STATES PATENT OFFICE.

THOMAS CHARLES MARTIN, OF CLEVELAND, OHIO.

ATTACHMENT FOR TOBACCO-PIPES.

SPECIFICATION forming part of Letters Patent No. 736,757, dated August 18, 1903.

Application filed December 12, 1902. Serial No. 134,992. (No model.)

*To all whom it may concern:*

Be it known that I, THOMAS CHARLES MARTIN, a citizen of the United States, residing at Cleveland, in the county of Cuyahoga and State of Ohio, have invented a certain new and useful Improvement in Attachments for Tobacco-Pipes, of which the following is a full, clear, and exact description, reference being had to the accompanying drawings.
The primary object of the invention is to provide an attachment for tobacco-pipes capable of being connected in between the ordinary bowl and stem without changing either by which the temperature of the smoke is greatly reduced before it reaches the mouth of the smoker and within which the volatile constituents of the smoke will be to a great extent condensed and trapped in a reservoir at one end and the saliva from the stem will be separately trapped in another reservoir in the other end of said attachment.

Another object of the invention is to construct the attachment in such a manner that it will be small and inexpensive and thoroughly practical and will be capable of being very easily cleaned.

The invention is also adapted for use as a scientific instrument by chemists to facilitate the qualitative and quantitative analysis of tobacco-smoke.

The invention may be here summarized as an attachment for tobacco-pipes, consisting in the construction and combination of parts hereinafter described, and pointed out definitely in the claims, whereby said objects are attained.

Figure 1:
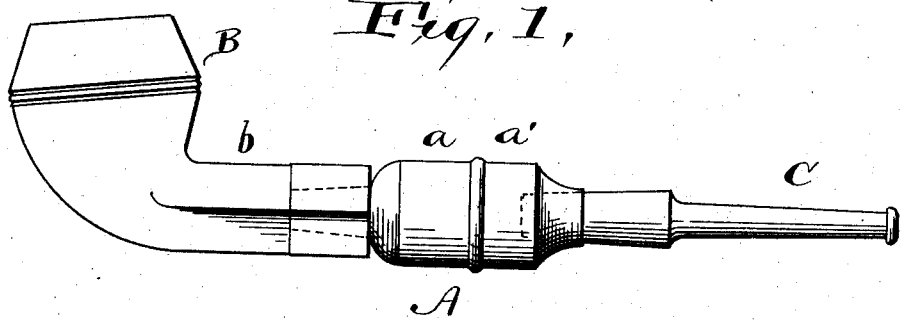
Figure 2:
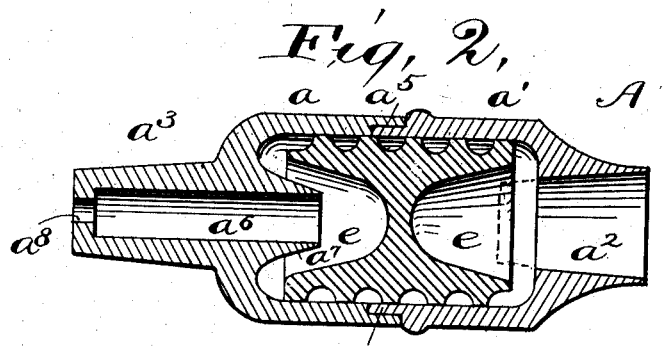
Figures 3, 4:
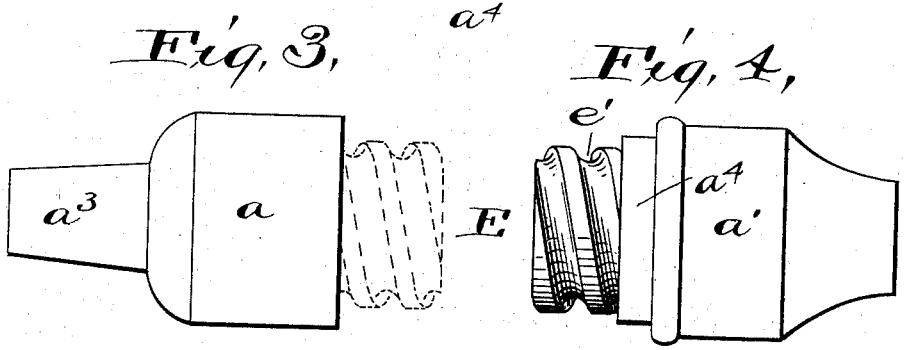

In the drawings, Figure 1 is a side view of a pipe with my attachment connected thereto. Fig. 2 is a central longitudinal sectional view of the attachment. Figs. 3 and 4 are side views of the two parts of the attachment when separated from each other and when one of them obtains the core to be hereinafter described.

As shown in Fig. 1, the attachment A is adapted to be connected in between the bowl B and stem C, which are of ordinary construction, the bowl-stem $b$ having a tapered opening (indicated by dotted lines in Fig. 1) and the stem C having a tapered end which would fit the opening in the bowl-stem were the two parts connected together as in ordinary use.

The attachment embodying the present invention is a tubular case made of two separable parts $a\ a'$ and having in one end a tapered hole $a^2$ to receive the tapered end of the stem C, as shown in Fig. 1, and having at the other end a longitudinally-perforated tapered projection $a^3$, which is constructed so as to fit in the tapered hole in the pipe-bowl stem $b$. One of the parts of the case has a reduced end $a^4$, which fits tightly but removably into a rabbeted groove $a^5$ in the adjacent end of the other part. The recess within the case extends about equally into both parts thereof and is of cylindrical form, except that the ends of this recess are concave, being so formed by inwardly curving the ends of the cylindrical walls of said recess. A cylindrical core E is fitted into this cylindrical recess, being of such length that its endwise movement is prevented by the inwardly-curved ends of said recess. In the ends of this core are the cup-shaped cavities $e\ e$, which, together with the adjacent concave ends of the recess in the casing, constitute reservoirs. In the periphery of the core, extending from one end to the other, is a spiral groove $e'$. When the core is in the case, there is therefore a spiral passage-way connecting these two reservoirs in the ends of said case. A longitudinal hole is formed through the projection $a^3$ to the adjacent reservoir within the case, and within this reservoir, around this hole $a^6$, is an inwardly-projecting conical boss $a^7$, whose base is merged into the curved end wall of the recess within said case. In the hole $a^6$, near its outer end, is an inwardly-projecting flange $a^8$.

The parts of the attachment being assembled, as shown in Fig. 2, said attachment is connected with the pipe and its stem, as shown in Fig. 1. When so connected, the stem C projects into the reservoir at the adjacent end of the case, as indicated by dotted lines in Figs. 1 and 2, and thereby serves as a trap to prevent the saliva which has flowed into said reservoir from the stem from flowing bank into the stem. The smoke is drawn from the pipe-bowl through the hole $a^6$ into adjacent reservoir within the casing. The cup-shaped cavity in the core presents a large curved surface against which this smoke impinges and upon which a very large part of the volatile constituents of the smoke are condensed. The smoke is then deflected backward into that part of the reservoir which is formed by the curved end walls thereof, upon which walls the condensation of the volatile constituents of the smoke is continued, and thence the smoke passes into the spiral channel which winds about the core. It necessarily flows from this channel into the reservoir at the opposite end of the case and thence out through the stem C. There will of course be some condensation of the smoke within the hole $a^6$, but the inwardly-turned flange $a^8$ prevents this from flowing into the pipe-bowl. It is obvious that substantially all of the volatile constituents of the smoke will be trapped in the reservoir within the casing adjacent to the bowl, while all of the saliva which flows into the casing through the stem will be trapped in a reservoir at the opposite end of said core. The stem and pipe-bowl are always kept dry, therefore, and the smoke by its long travel in the spiral groove is well cooled before it reaches the smoker's mouth.

To clean the attachment, the case is separated and the core allowed to remain at one end or the other end thereof and both parts of the casing are inverted and shaken, whereby moisture in the reservoir will be removed. Then the projecting end of the core may be put in the other part of the casing and there held as it is removed from the part in which it was at first, whereupon the reservoir so open may be cleaned in like manner.

Having described my invention, I claim—

1. An attachment for tobacco-pipes, consisting of a case made of two separable parts, and containing a recess formed about equally in each part, one part having in its end a hole for the reception of a pipe-stem, and the other part having a longitudinally-perforated projection for engagement with a pipe-bowl stem, combined with a core fitted in said recess and having an external spiral groove which communicates at its ends with the ends of said recess, substantially as and for the purpose specified.

2. An attachment for tobacco-pipes consisting of a case made of two separable parts and containing a cylindrical recess with concave curved ends; which recess is formed about equally in said parts, one of said parts having in its end a hole for the reception of a pipe-stem, and the other part having a longitudinally-perforated projection for engagement with a pipe-bowl stem, combined with a cylindrical core fitted in the cylindrical part of said recess and having an external spiral groove which extends from end to end, substantially as specified.

3. An attachment for tobacco-pipes consisting of a case made of two separable parts, and containing a cylindrical recess formed about equally in each part; one part having in its end a hole for the reception of the pipe-stem, and the other part having a longitudinal perforated projection for engagement with the pipe-bowl stem, said projection having near its outer end an annular flange extending into said perforation, combined with a core fitted to said recess and having an external spiral groove which communicates at its ends with the ends of said recess, substantially as specified.

4. An attachment for tobacco-pipes consisting of a case made of two separable parts and containing a cylindrical recess formed about equally in each part, one part having in its end a hole for the reception of the pipe-stem and the other part having a longitudinally-perforated projection for engagement with the pipe-bowl stem, combined with a core having in each end a cup-shaped cavity and having in its periphery a spiral groove which communicates with the ends of said recess, substantially as specified.

5. An attachment for tobacco-pipes consisting of a case made of two separable parts, and containing a cylindrical recess with inwardly-curved ends, which recess is formed about equally in each of said parts, one of said parts having in its end a hole for the reception of the pipe-stem, and the other part having at its end a longitudinally-perforated projection for engagement with the pipe-bowl, and having within said recess surrounding said perforation an inwardly-projecting conical boss whose base is merged with the curved end of said recess, combined with a core fitted to the cylindrical part of said recess and having an external spiral groove extending from end to end, substantially as specified.

In testimony whereof I hereunto affix my signature in the presence of two witnesses.

THOMAS CHARLES MARTIN.

Witnesses:
  ALBERT H. BATES,
  H. M. WISE.